Patented Feb. 1, 1944

2,340,699

UNITED STATES PATENT OFFICE 2,340,699

SYNTHETIC RUBBER COMPOSITION

Donald V. Sarbach, Cuyahoga Falls, Ohio, assignor to The B. F. Goodrich Company, New York, N. Y., a corporation of New York No Drawing. Application July 2, 1943,
Serial No. 493,291

4 Claims. (Cl. 260—27)

This invention relates to synthetic rubber compositions, and particularly to compositions containing a rubbery copolymer of a butadiene-1,3 hydrocarbon and an acrylic nitrile.

The processing, compounding and vulcanization of synthetic rubber has in general presented many problems not encountered with natural rubber due to different behavior on roll mills, differences in plasticity and tackiness, incompatibility of synthetic rubber with certain softening or plasticizing agents commonly employed in natural rubber, differences in molding, differences in vulcanization, differences in cement manufacture, and other differences in properties. These difficulties have been particularly pronounced in the case of the oil-resisting synthetic rubber prepared by the copolymerization of a butadiene-1,3 hydrocarbon and an acrylic nitrile. This type of synthetic rubber ordinarily lacks plasticity and tackiness and is difficult to process satisfactorily, particularly at high temperatures, unless it is first mixed with softeners. Although certain softeners have been employed with such synthetic rubber to improve its processing characteristics, many of the softeners heretofore employed do not impart tackiness thereto, do not enable the rubber to be worked satisfactorily at high temperatures and, moreover, the presence of such softeners often deleteriously affects the physical properties, oil and heat resistance of vulcanizates prepared from compositions containing them.

I have now discovered that the use of shellac as a processing and compounding ingredient for synthetic rubber of the butadiene-1,3 hydrocarbon, acrylic nitrile copolymer type, unexpectedly improves not only the processing and compounding properties of such synthetic rubber, but also the properties of the vulcanizates prepared therefrom. Thus, it has been found that shellac is an excellent softener for synthetic rubbers of this type and is particularly effective in improving workability and tackiness at elevated temperatures, thereby markedly aiding high-temperature mixing, calendering and extruding. Shellac has also been found to improve the molding characteristics of this type of synthetic rubber, the presence of shellac increasing flow and fusion during the molding process and eliminating the flow cracks ordinarily found in molded goods comprising this synthetic rubber. Vulcanizates prepared from compositions comprising this synthetic rubber and shellac, have also been found to exhibit excellent physical properties, decreased permeability to gases, increased heat resistance, improved adhesion to fabrics, and even an oil resistance superior to that of the copolymer without shellac. Shellac also improves the appearance of vulcanized articles made from compounds containing it. Moreover, the presence of shellac in cements prepared from this synthetic rubber decreases undesirable gelling of the cement, and also improves the tackiness and adhesive properties of the cement.

It is recognized that shellac has heretofore been employed as a processing and compounding ingredient for natural rubber, but the effect produced on synthetic rubber of the butadiene-1,3 hydrocarbon acrylic nitrile copolymer type is unexpectedly different from and far superior to the effect produced by shellac in natural rubber. Thus, it is known that the presence of shellac in natural rubber decreases its tackiness, whereas the use of shellac with this synthetic rubber increases its tackiness at elevated temperatures. Moreover, the use of shellac with natural rubber is limited because of the fact that shellac retards the cure, whereas with this synthetic rubber, it has been found that shellac has little, if any, effect upon the rate of cure.

In the practice of the invention the incorporation of the shellac with the synthetic rubber may be effected by any desired method, as by adding the shellac to the rubber while the rubber is being worked on a roll mill, masticating a mixture of the rubber and the shellac in an internal mixer, or by adding the shellac to a solution of the synthetic rubber such as a cement, or to a dispersion of the synthetic rubber, such as a synthetic latex.

The amount of the shellac to be used in any given instance will depend upon the particular properties desired in the composition and may be varied widely. When it is desired to produce a solid synthetic rubber composition possessing excellent plasticity, easy workability, and excellent tackiness, to be molded or otherwise vulcanized, it is generally desirable to use from 5 to 50 parts or even more of the shellac, preferably from 10 to 30 parts, for each 100 parts of the synthetic rubber. In synthetic rubber cements, on the other hand, it has been found that the addition of as little as one part of shellac, and preferably from 2 to 15 parts, for each 100 parts of the synthetic rubber in the cement will retard gelling of the cement and increase its tackiness. Thus, it may be said that the use of amounts varying from one part of shellac per 100 of synthetic rubber to equal parts of shellac and the synthetic rubber, offers advantages.

In order further to illustrate the use of shellac in synthetic rubber prepared by copolymerizing a butadiene-1,3 hydrocarbon and an acrylic nitrile, the following examples are set forth:

Example I

A synthetic rubber composition is prepared by incorporating on a roll mill 20 parts by weight of shellac in 100 parts by weight of a rubbery copolymer prepared by copolymerizing in aqueous emulsion 55 parts by weight of butadiene-1,3 and 45 parts by weight of acrylonitrile. The shellac adds to the synthetic rubber to produce a plastic quite tacky batch, which may be processed at temperatures somewhat higher than is ordinarily possible with this copolymer. The composition is then mixed with conventional compounding and vulcanizing ingredients, including carbon black, zinc oxide, sulphur and a vulcanization accelerator, all of which are found to be readily dispersed in the composition, and the composition is then vulcanized in a mold. An excellent vulcanizate, which is free from the laminations and flow cracks ordinarily produced in vulcanizates of this synthetic rubber, due to the inability of the polymer to stick or fuse to itself, is obtained. Moreover, the vulcanizate possesses excellent tensile strength, and elongation, a high durometer hardness, excellent heat resistance and retains the excellent oil resistance characteristic of the butadiene-1,3 acrylonitrile synthetic rubber. The vulcanizate is also much more impermeable to the diffusion of gases than are similar vulcanizates prepared from compositions not containing shellac.

*Example II*

A synthetic rubber cement is prepared by dissolving a composition containing a rubbery copolymer of 55 parts of butadiene-1,3 and 45 parts of acrylonitrile compounded with channel black, zinc oxide, coal tar, phenyl-beta-naphthylamine and sulphur, in a volatile organic solvent therefor, such as ethylene dichloride, chlorobenzene, acetone, methyl ethyl ketone, ethyl acetate or the like. Such a cement is unstable and gels readily, especially when the concentration of the synthetic rubber composition in the solvent is as high as about 20%. However, if two parts of shellac are added to the cement or to the synthetic rubber composition before it is dissolved in the solvent, it is found that gelling is remarkably retarded. Moreover, the presence of shellac in the cement increases its tack and adhesive properties and improves the resistance to gas diffusion of films deposited from such cement. Such compositions are particularly effective for spreading or impregnating gas mask or balloon fabrics.

*Example III*

A composition is prepared by mixing the following ingredients on a two-roll mixing mill:

| | |
|---|---|
| Butadiene-1,3 acrylonitrile copolymer prepared by the emulsion copolymerization of 55 parts butadiene-1,3 and 45 parts acrylonitrile | 100.00 |
| Carbon black | 100.00 |
| Zinc oxide | 5.00 |
| Dibutyl phthalate | 10.00 |
| Shellac | 15.00 |
| Stearic acid | 1.00 |
| Sulfur | 1.25 |
| Benzothiazyl disulfide | 1.25 |

The composition is then vulcanized in a mold for 30 minutes at 310° F. whereupon an excellent molded product was obtained.

Various other butadiene-1,3 acrylonitrile synthetic rubber compositions comprising shellac may be prepared and may be used generally for any of the purposes for which this synthetic rubber is ordinarily employed. Thus, in addition to the use of such compositions in molded goods generally, and in synthetic rubber cements, it has also been found that compositions comprising shellac are particularly useful in the manufacture of synthetic sponge rubber, in the manufacture of synthetic ebonite, and for various other purposes.

Although the synthetic rubber used in the specific example was prepared by copolymerizing butadiene-1,3 and acrylonitrile in the ratio of 55 to 45, other synthetic rubbers prepared from these monomers in other proportions, as well as other synthetic rubbers prepared by the copolymerization of one or more other butadiene-1,3 hydrocarbon such as isoprene, 2,3-dimethyl butadiene-1,3, piperylene, methyl pentadiene and the like, and one or more other acrylic nitriles such as methacrylonitrile, ethacrylonitrile, alpha-chloro acrylonitrile, alpha-methoxy acrylonitrile, and the like may also be used. The polymerization to form a synthetic rubber may be accomplished by any of the well-known methods such as polymerization in aqueous emulsion, homogeneous polymerization, etc.

The term "shellac" as used herein is understood to include the various kinds of lac resin such as native-made, machine-made, dewaxed or bleached shellac, button lac, seedlac, or sticklac. The preferred type is the high-grade machine-made, such as beta or delta shellac.

Other materials such as natural rubber, other softeners, pigments, fillers, vulcanizing agents, accelerators, antioxidants, and the like may be included in the compositions herein described. Other modifications which will be apparent to those skilled in the art are within the spirit and scope of the invention as defined in the appended claims.

I claim:

1. A composition of matter comprising shellac and a synthetic rubber prepared by copolymerizing a butadiene-1,3 hydrocarbon and an acrylic nitrile.

2. A composition of matter comprising shellac and a synthetic rubber prepared by copolymerizing butadiene-1,3 and acrylonitrile.

3. A synthetic rubber cement comprising a composition of shellac and a rubbery butadiene-1,3 acrylonitrile copolymer, dissolved in a volatile organic solvent.

4. A vulcanized synthetic rubber composition prepared by vulcanizing a composition comprising shelac and a synthetic rubber prepared by copolymerizing butadiene-1,3, and acrylonitrile.

DONALD V. SARBACH.